(No Model.)

J. E. MERRIMAN.
MANUFACTURE OF CASTERS.

No. 264,095. Patented Sept. 12, 1882.

WITNESSES
Willard C. Fogg.
Fred Harris

INVENTOR
J. E. Merriman
by his attys
Crosby & Raymond

UNITED STATES PATENT OFFICE.

JULIUS E. MERRIMAN, OF MERIDEN, CONNECTICUT, ASSIGNOR TO FOSTER, MERRIAM & CO., OF SAME PLACE.

MANUFACTURE OF CASTERS.

SPECIFICATION forming part of Letters Patent No. 264,095, dated September 12, 1882.

Application filed May 18, 1882. (No model.)

*To all whom it may concern:*

Be it known that I, JULIUS E. MERRIMAN, of Meriden, in the county of New Haven and State of Connecticut, have invented a certain new and useful Improvement in Furniture-Casters, of which the following is a full, clear, and exact description, reference being had to the accompanying drawings, forming a part of this specification, in explaining its nature, in which—

Figure 1:
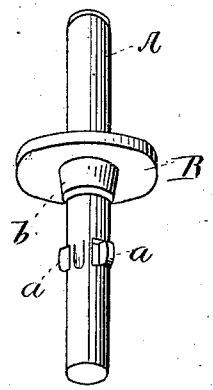
Figure 3:
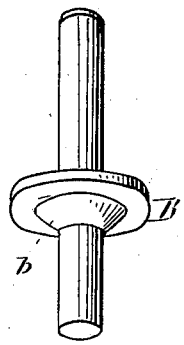
Figure 2:
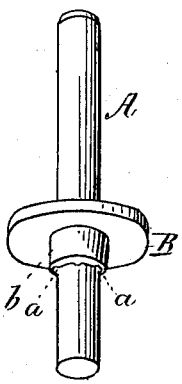
Figure 4:
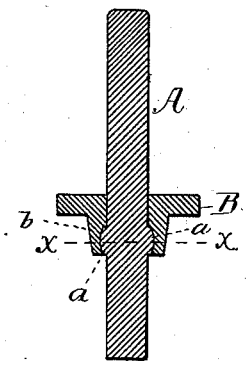
Figure 6:
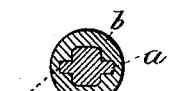

Figure 1 represents a perspective view of the parts of the caster to which my invention pertains before they are united, as hereinafter explained. Fig. 2 represents in perspective a stage in the process of manufacture hereinafter referred to. Fig. 3 represents the complete invention, which is also shown in vertical section in Fig. 5. Fig. 4 is a vertical section of the parts as represented in Fig. 2, and Fig. 6 is a horizontal section upon the line $x\,x$ of Fig. 4.

The invention relates to means for fastening or securing a disk or flange to the caster-spindle; and it consists in forming upon the spindle by upsetting or otherwise one or more projections, points, or outwardly-projecting portions caused by the displacement of the metal from the shape of the remainder of the spindle, and over and about which a sleeve or thimble forming a part of the disk or flange is driven and compressed or swaged.

Figure 5:
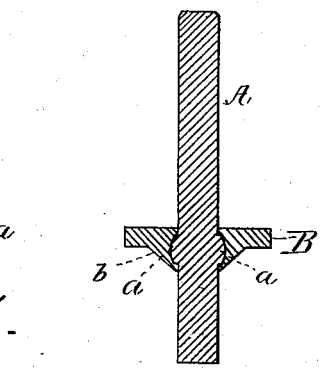

In the drawings, A is the caster-spindle. B is the disk or flange, and $b$ is the sleeve or thimble thereof. The disk or flange and its sleeve have a hole of about the diameter of the spindle, and in securing the parts together the disk or flange is slipped upon the spindle, as shown in Fig. 1, and is then driven over the projections $a$, as shown in Figs. 2, 4, and 6, and the sleeve or thimble is then swaged or compressed upon and about the projections, so as to embed them therein, substantially as shown in Fig. 5. Of course, when driven on, the sleeve or thimble $b$ must be made of a metal sufficiently ductile to permit of its being driven on and over the projections without stripping them from the spindle, and to be compressed thereon after it has been so driven, and I prefer brass or composition. It is not essential, however, that the sleeve or thimble be driven over the projections, as they may be formed with recesses that shall correspond in size and location to the projections $a$, and in that case the flange or disk and sleeve will be placed in position upon the spindle with the projections in said recesses therein, and the thimble or sleeve then swaged or compressed about them, and when this construction is used flanges and sleeves of malleable iron may be employed.

The advantages of this invention consist in the strength with which the flange or disk is secured to the spindle, and also in the economy of construction, and in the ease with which they can be put together.

Having thus fully described my invention, I claim and desire to secure by Letters Patent of the United States—

The process of attaching flanges or disks to spindles in the manufacture of casters, consisting, first, in upsetting or displacing the metal of the spindle to form projections thereon; second, in driving the sleeved disk or flange B upon and over said projections; and, third, in compressing the sleeve of said disk or flange about said projections, whereby they are embedded in the sleeve, all substantially as and for the purposes described.

JULIUS E. MERRIMAN.

Witnesses:
GEO. C. MERRIAM,
NELSON C. MERRIAM.